Figure 6:
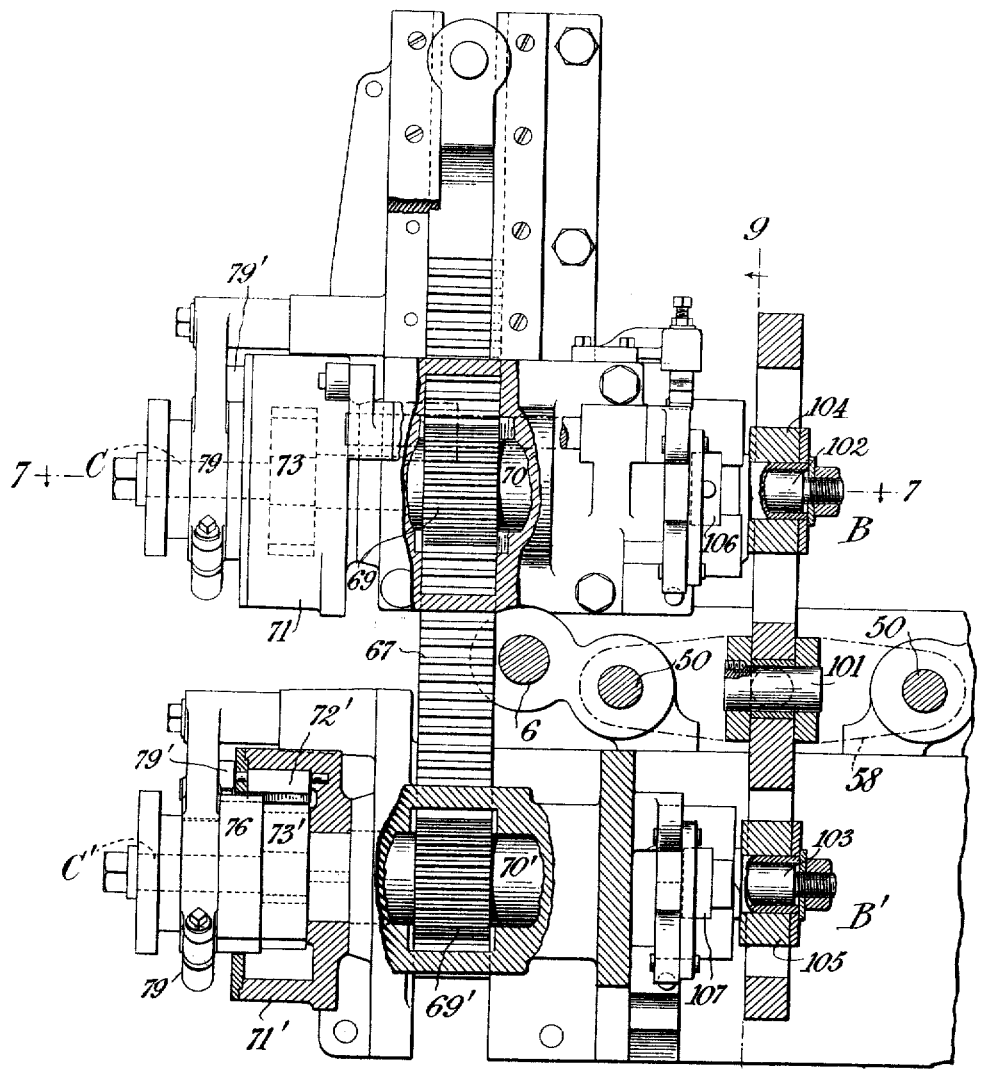

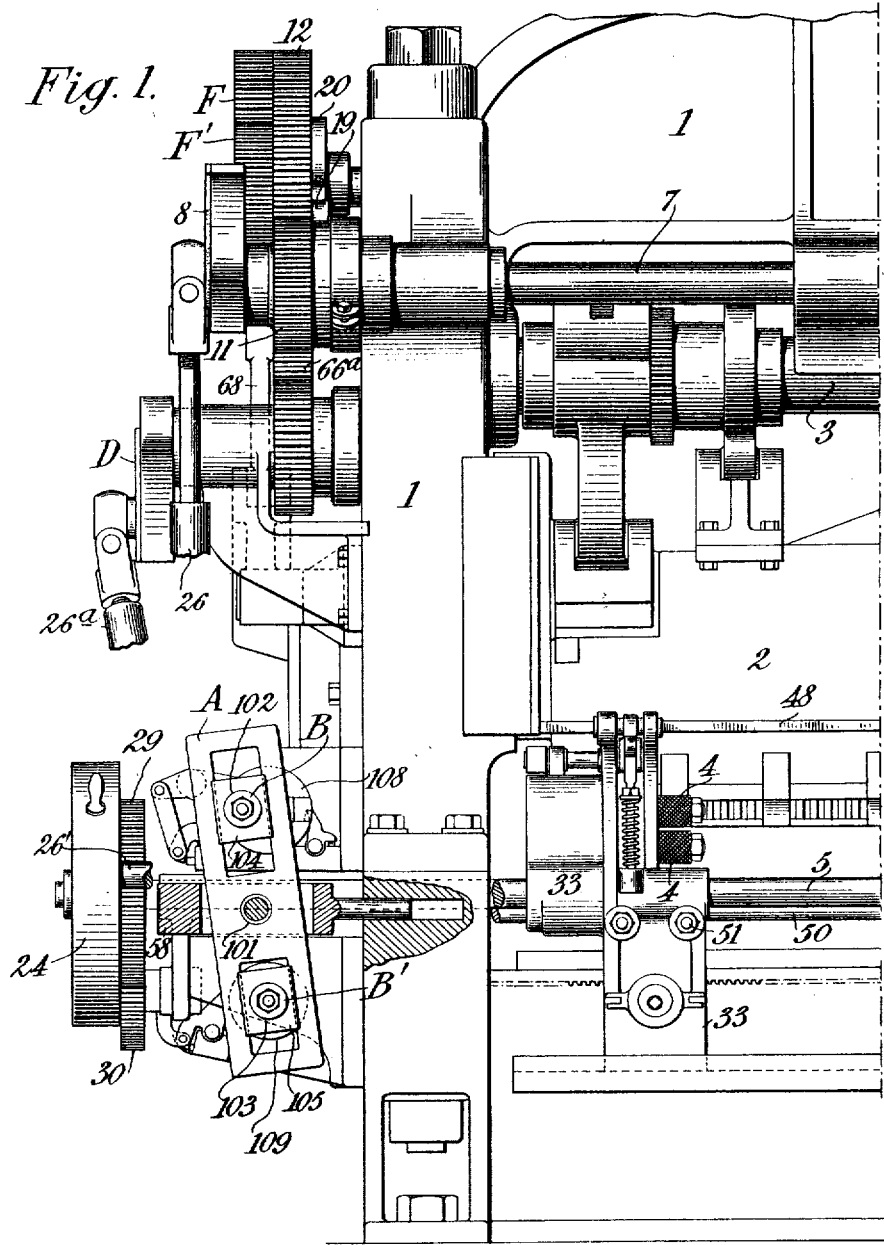

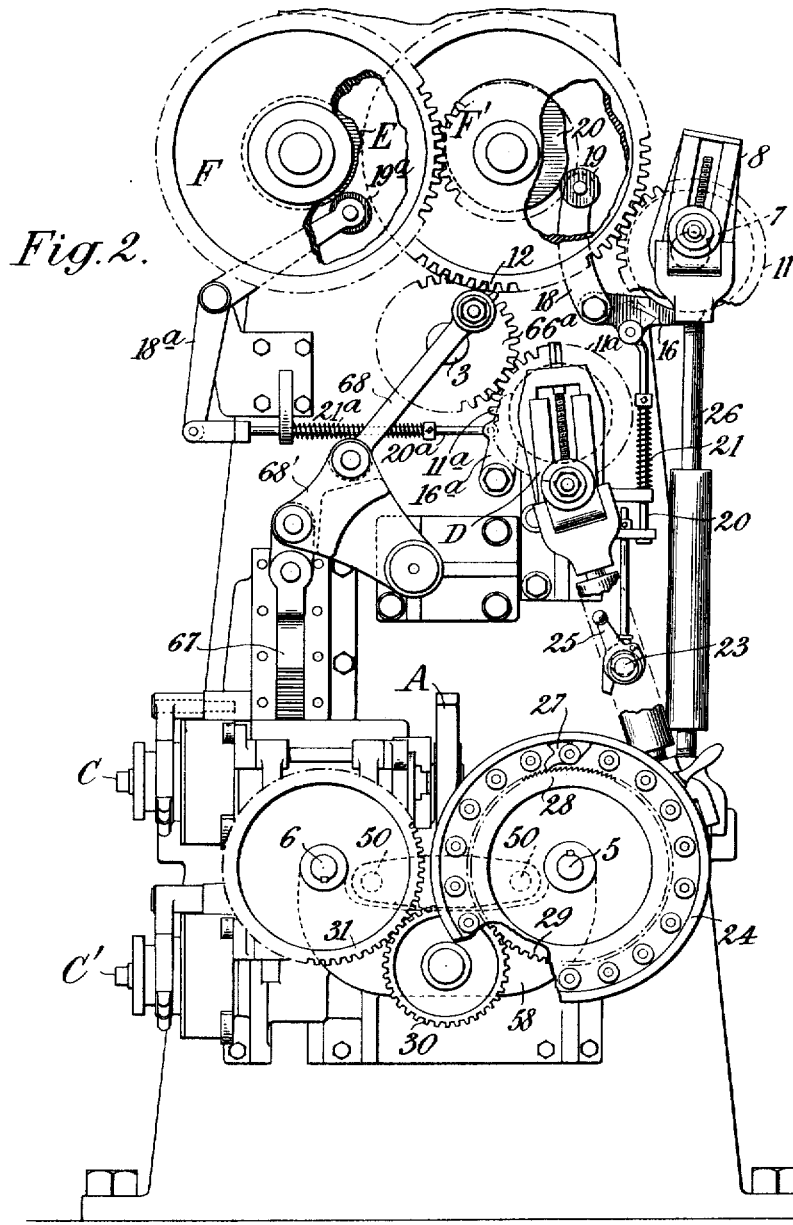

F. M. LEAVITT.
FEED MECHANISM FOR PERFORATING MACHINES.
APPLICATION FILED DEC. 15, 1910.
1,010,157.
Patented Nov. 28, 1911.
10 SHEETS—SHEET 3.
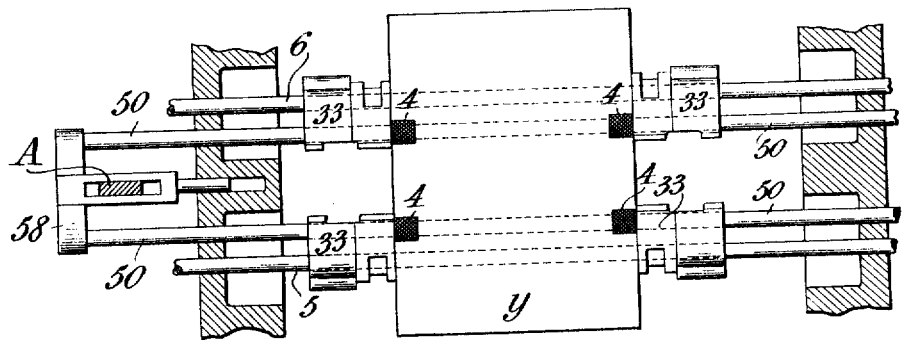
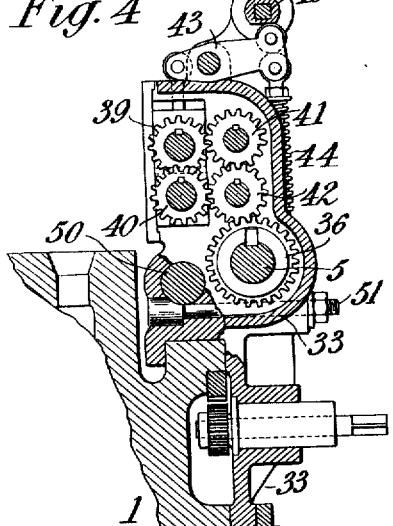
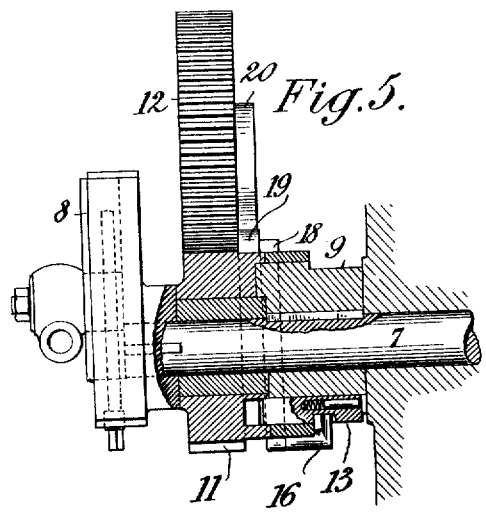
INVENTOR:
Frank M. Leavitt,
By Attorneys, F. M. LEAVITT.
FEED MECHANISM FOR PERFORATING MACHINES.
APPLICATION FILED DEC. 15, 1910.

1,010,157.

Patented Nov. 28, 1911.
10 SHEETS—SHEET 4.

WITNESSES:

INVENTOR:
Frank M. Leavitt,
By Attorneys,

F. M. LEAVITT.
FEED MECHANISM FOR PERFORATING MACHINES.
APPLICATION FILED DEC. 15, 1910.

1,010,157.

Patented Nov. 28, 1911.

10 SHEETS—SHEET 5.

WITNESSES:
Fred White
René Bruine

INVENTOR:
Frank M. Leavitt,
By Attorneys,
Fraser, Dunk & Myers

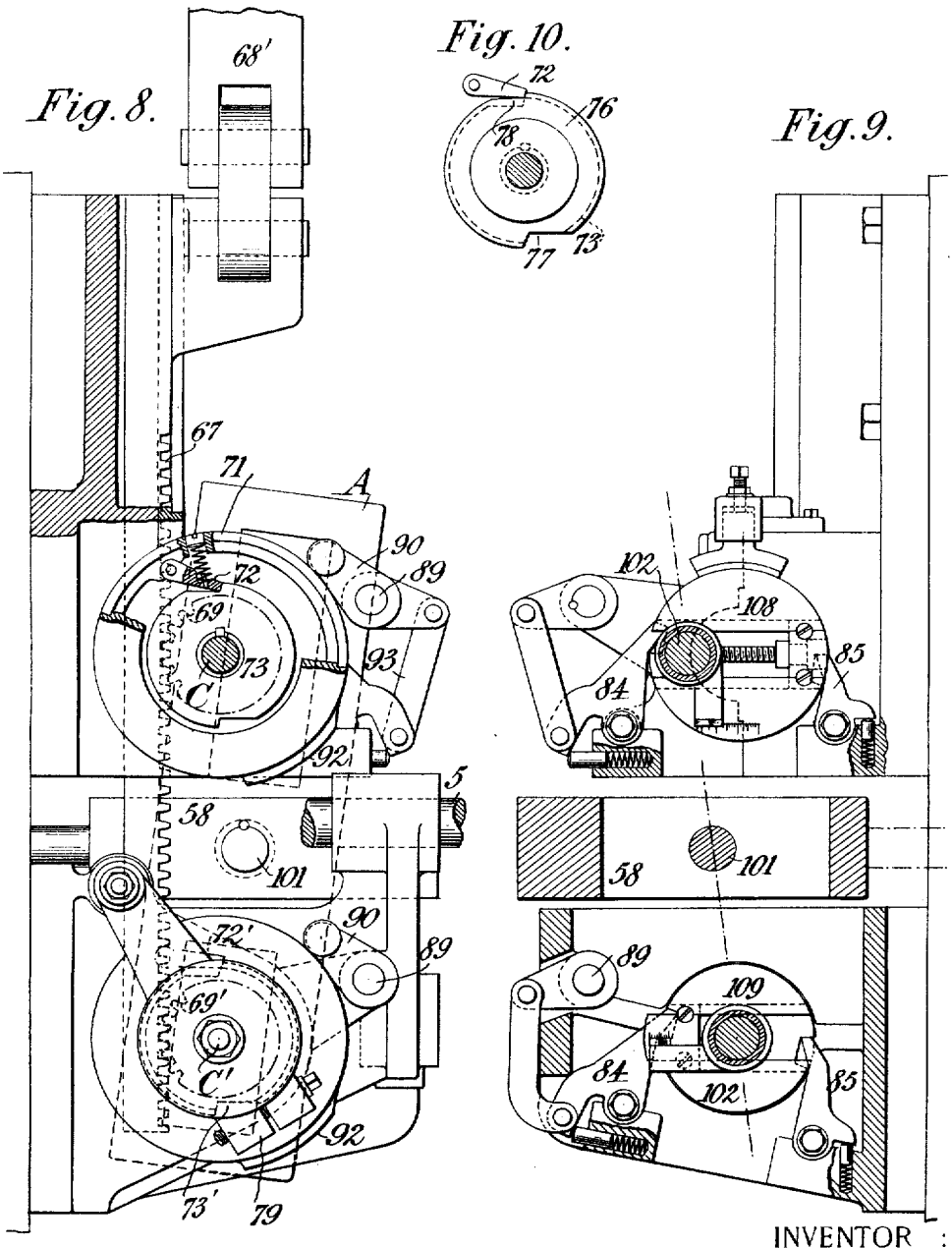

F. M. LEAVITT.
FEED MECHANISM FOR PERFORATING MACHINES.
APPLICATION FILED DEC. 15, 1910.
1,010,157.
Patented Nov. 28, 1911.
10 SHEETS—SHEET 7.
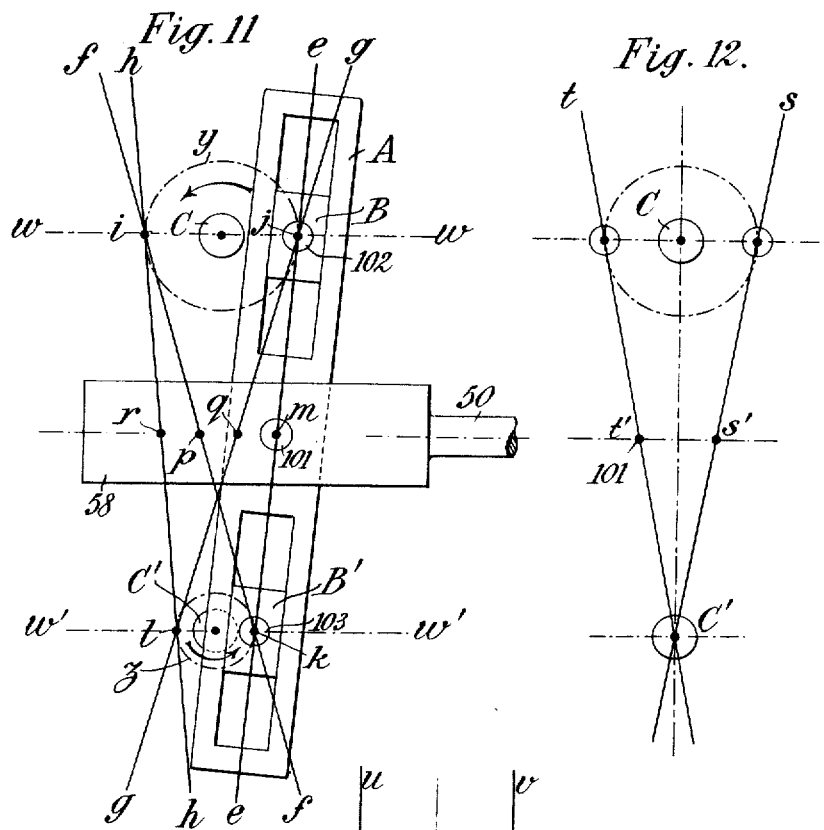
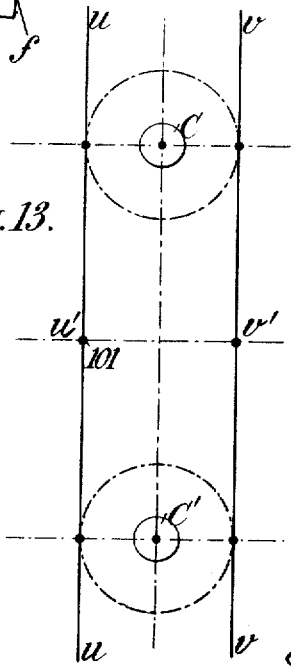
WITNESSES:
INVENTOR:
Frank M. Leavitt,
By Attorneys, F. M. LEAVITT.
FEED MECHANISM FOR PERFORATING MACHINES.
APPLICATION FILED DEC. 15, 1910.
1,010,157.
Patented Nov. 28, 1911.
10 SHEETS—SHEET 8.
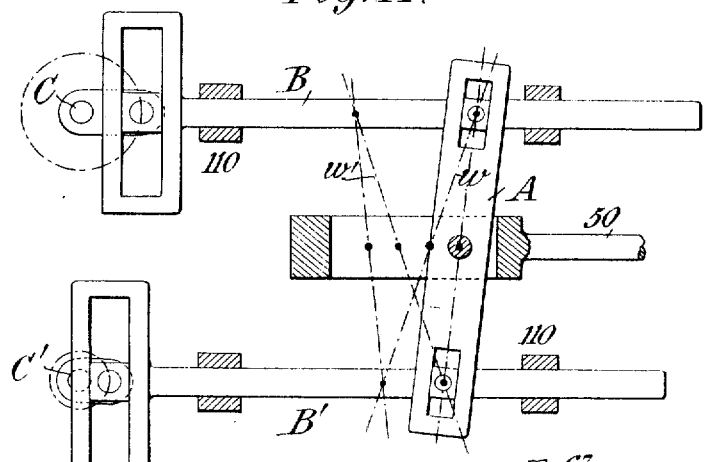
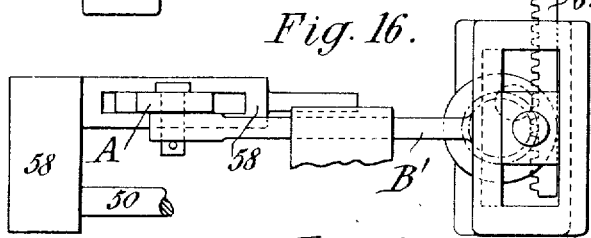
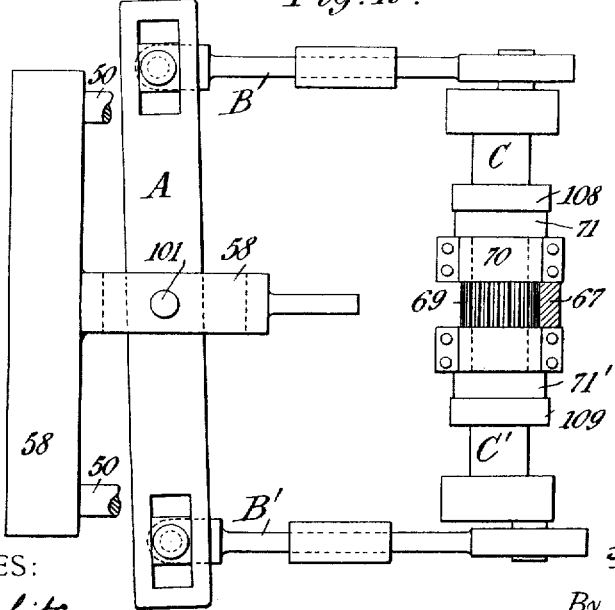
WITNESSES:
Fred White
René Bruine
INVENTOR:
Frank M. Leavitt,
By Attorneys, F. M. LEAVITT.
FEED MECHANISM FOR PERFORATING MACHINES.
APPLICATION FILED DEC. 15, 1910.

1,010,157.                                       Patented Nov. 28, 1911.
                                                     10 SHEETS—SHEET 10.

WITNESSES:

INVENTOR:
Frank M. Leavitt,
By Attorneys,

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA.

FEED MECHANISM FOR PERFORATING-MACHINES.

1,010,157. Specification of Letters Patent. Patented Nov. 28, 1911.

Application filed December 15, 1910. Serial No. 597,423.

*To all whom it may concern:*

Be it known that I, FRANK M. LEAVITT, a citizen of the United States, residing in the borough of Brooklyn, county of Kings, city and State of New York, have invented certain new and useful Improvements in Feed Mechanisms for Perforating - Machines, &c., of which the following is a specification.

This invention relates generally to machines for perforating, punching, embossing or similar treatment of a sheet of metal, cardboard or other material.

It is designed especially for perforating machines or punching presses having a series or gang of punches to simultaneously form a row of perforations in the sheet, these perforations being repeated at successive punchings in suitable order to perforate the sheet in the desired manner, as for example, with its perforations arranged in either opposite or alternate order. Such machines are used, for example, for punching sheets of metal to be used as screen-plates. Machines of this class are commonly provided with an advance feed for feeding the sheet forward or longitudinally, and with a transverse feed for feeding it laterally. These feeds operate simultaneously or alternately, so that the sheet may be fed either longitudinally, transversely, or by a combined movement, obliquely. The feeding occurs between the punching operations, so that the feed mechanisms, or either of them, operate at each up-stroke of the punches. Thus, according to the feed desired, each periodical feeding operation is effected by a movement of the advance feed alone, or of the transverse feed alone, or of both together. The advance feed operates always in a forward direction; but the transverse feed operates in both directions, so as to feed the sheet to either the right or left. Commonly, the transverse feed at one stroke moves to the right, and at its next stroke moves to the left. The periodical action of the respective feed mechanism is commonly accomplished by the combination of a crank movement and a pawl and ratchet, the latter having two teeth, so that at each half-forward and half-backward turn imparted by the crank, the feed mechanism is moved forward during the one half-turn and remains at rest during the next half-turn. To cause either feed mechanism to move semi-periodically, that is, to remain at rest during every alternate period, it is common to apply to the ratchet an idler ratchet constructed to mask the main ratchet at each alternate movement whereby the impelling pawl on each alternate stroke turns both ratchets. Other means for accomplishing such alternate or periodical actions are known in the art and may be availed of in connection with my invention.

In machines of the class referred to the sheet is commonly controlled by being gripped between pairs of feed rolls to which are imparted two movements, viz: (1) a rotative movement imparted by the advance feed mechanism for feeding the sheet forward, and (2) a bodily movement to right or left imparted by the transverse feed mechanism for feeding the sheet laterally. The advance feed movements are imparted intermittently or periodically by suitable mechanism such as a crank operating a ratchet, the extent of movement being variable by adjusting the throw of the crank. For the transverse feed the pairs of feed rolls are connected together through the medium of a feed-frame (which may be a mere connecting bar), and which is connected to the transverse feed mechanism.

The object of the present invention is to provide a feed mechanism which shall be capable of a greater range or variety of feed movements than heretofore, so that under convenient manual control the mechanism can be set to perform any combination of feeding movements required for perforating or otherwise treating the sheet according to any order or arrangement desired.

To this end the invention introduces a new mechanical movement for operating the transverse feed, in order to impart to the sheet right or left hand movements to the extent of one, two or three units in any desired order, and adjustable to any desired amplitude within practical limits. The control of the advance feed is properly correlated to the transverse feed in order to attain the desired result.

The invention also provides a skip or jump feed for feeding forward the sheet any desired distance at controllable intervals, to leave portions of the sheet unperforated.

The transverse feed mechanism comprises essentially a lever pivotally connected to the feed-frame or its equivalent, and having its opposite arms engaged by means for imparting to them reciprocating movements in either direction, and which means may for convenience be called "reciprocators". These reciprocators are moved periodically from side to side, their movements being simultaneous or alternate, and periodical or semi-periodical, according to the manual preparation or adjustment of their driving means. For some purposes they may have equal strokes and engage the lever at equal distances from its pivot; so that the movement of either reciprocator alone imparts through the lever to the transverse feed a movement of half the extent of that of the moving reciprocator. Or a movement of both reciprocators simultaneously to right or left would impart a movement to the transverse feed equal to the full stroke of each reciprocator. Thus the transverse feed may be moved either one or two units at a time in either direction. For other purposes the reciprocators may have unequal strokes, or engage the lever at unequal distances from its pivot, so that one of them exerts a greater effect upon the lever than the other, according to any desired ratio. For example, one reciprocator may have twice the stroke of the other (or otherwise may move the lever to twice the distance of the other), so that the movement of the minor reciprocator alone will impart through the lever to the transverse feed a movement of one unit; the movement of the major reciprocator alone will communicate a movement of two units; and the properly related movements of both reciprocators together may impart to the feed a movement of three units. These movements may be performed in either direction and in any prescribed order. The results thus attained are believed to be entirely new with the present invention.

The advance or forward feed comprises a ratchet-and-pawl or equivalent means for propelling the feed rollers and the carrier for the sheet, operated by one or two cranks, the latter being driven at prescribed intervals; and in the case of a jump or skip feed one crank is turned to give the normal feeding movements and the other to give the abnormal or skip movements. Both cranks engage the same feeding pawl or pawls, the connection being such as to admit of the movement being imparted by either crank alone while the other is at rest. A suitable construction is by the intermediation of telescopic connecting rods, which communicate the active movements but take up within them the inactive movements.

Although my invention is applicable to various types of machines for perforating and other purposes, I show it in the accompanying drawings as applied to a perforating machine which, in its general construction, has been well known for many years as the Bliss perforating press, and which in certain features of its feed mechanism, embodies a construction set forth in Letters Patent No. 813,049, granted February 20, 1906 to the E. W. Bliss Company, as assignor of B. J. Lindgren. For those features or details which are common to the machine shown in that patent and to the machine here illustrated, reference may be made to said patent for a more full understanding thereof.

Figure 7:
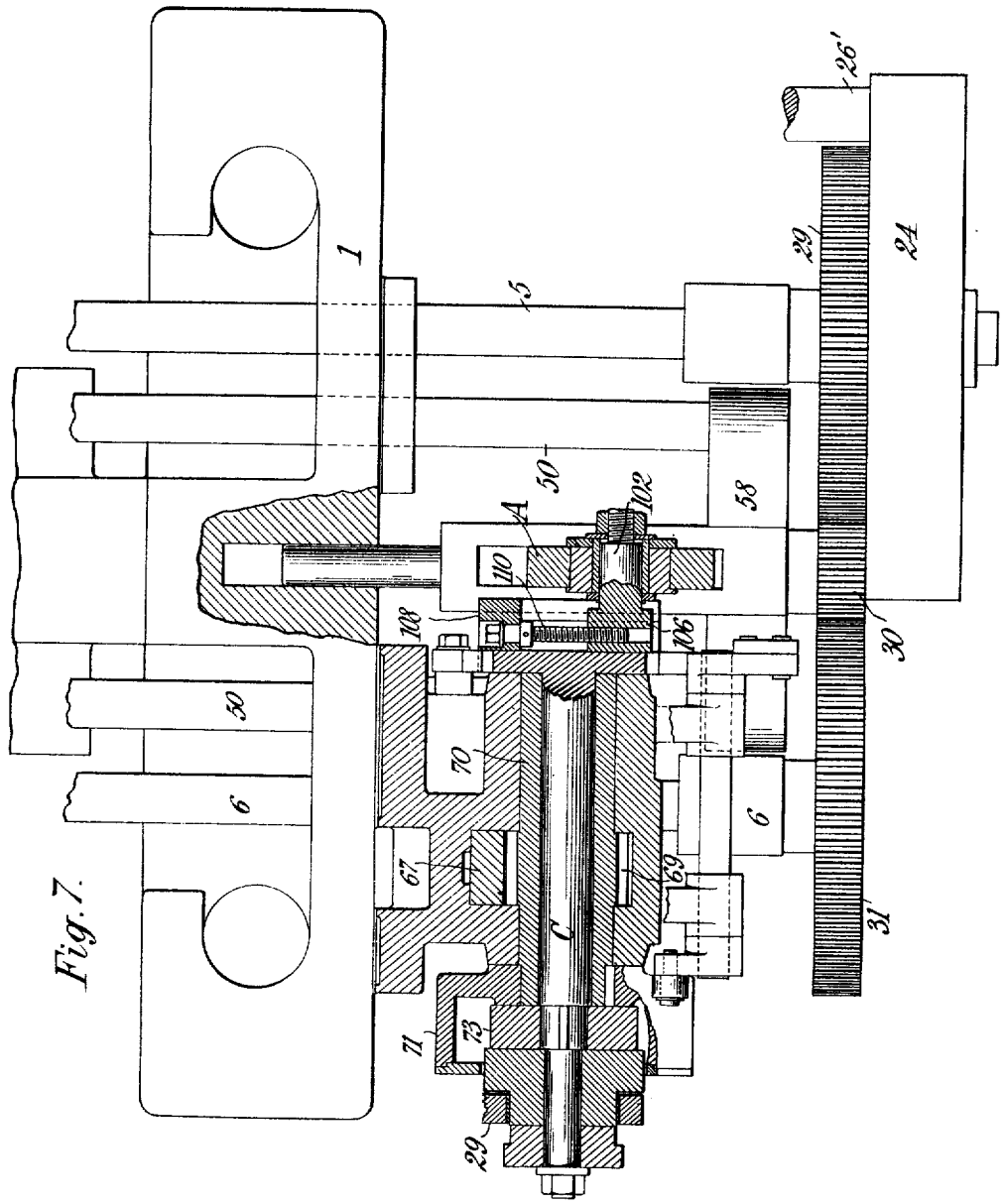
Figure 17:
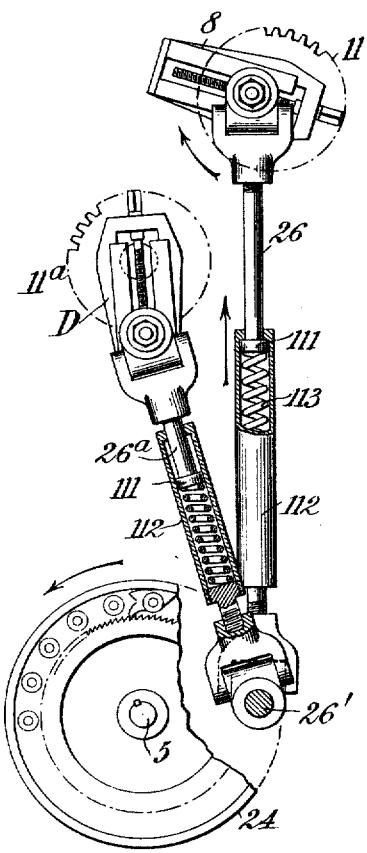

Figure 1 of the accompanying drawings is a partial front elevation showing the left half only of the machine, certain portions being broken away and parts shown in section. Fig. 2 is a left hand elevation of the machine, certain portions being broken away. Fig. 3 is a fragmentary sectional plan view, showing the sheet being fed and the feed mechanism immediately engaging the sheet, this view being on a smaller scale. Fig. 4 is a vertical transverse section showing a pair of feed rollers and their immediate driving means. Fig. 5 shows one of the cranks for imparting the forward feed, being a front view partly in vertical section. Fig. 6 is a sectional elevation of part of the transverse feed mechanism viewed from the left, being on a larger scale than Fig. 2, certain parts being in vertical section in the planes of the transverse feed crank shafts. Fig. 7 is a sectional plan of this mechanism, the section being on the plane of the line 7—7 in Fig. 6. Fig. 8 is a rear elevation of the same mechanism, partly in vertical section. Fig. 9 is a front elevation thereof mainly in vertical section taken partly on the line 9—9 in Fig. 6. Fig. 10 is an elevation showing the active and idler ratchets for the transverse feed shafts. Fig. 11 is a diagram illustrating a series of movements for the transverse feed. Figs. 12 and 13 are diagrams showing other movements therefor. Fig. 14 is a diagram showing a modification. Fig. 15 is a plan of a further modification, of which Fig. 16 is a side elevation. Fig. 17 is a sectional elevation of parts of Fig. 2. Figs. 18, 19, 20 and 21 are illustrations of different arrangements of punchings producible by means of the feeding mechanisms of this invention.

Before describing the machine, I will for greater clearness, give some examples of the different kinds of punching of which the machine to be described is capable.

Figure 18:
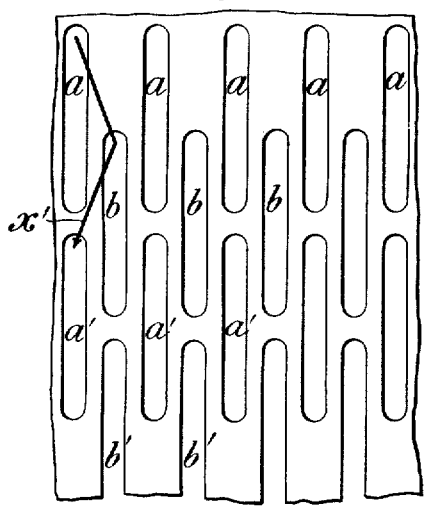
Figure 19:
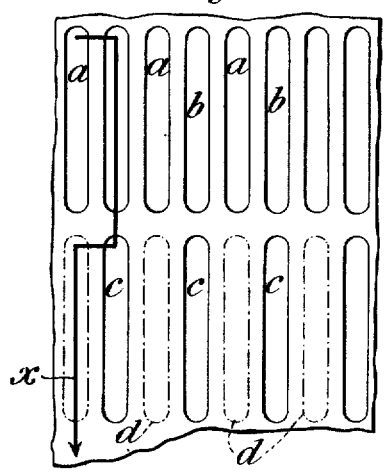

Referring to Figs. 18 and 19, the punchings $a$ $a$ are made simultaneously by one stroke of the press, and represent a suitable spacing of the punches. To punch the metal with rows of parallel punchings as close together as is shown in Fig. 19, it is necessary to first punch the holes or slots $a\ a$ and then feed the sheet laterally and then punch the intervening holes $b\ b$. For the next row the sheet is fed forward an appropriate distance and the holes $c\ c$ are punched; after which the sheet will be fed laterally in the contrary direction and the holes $d\ d$ punched; whereupon another forward feed is given and the series of operations is repeated. The feed of the sheet takes place as represented by the line $x$. The forward and transverse feeds operate thus alternately, each feed operating semi-periodically. For the form of "hit or miss" punching shown in Fig. 18 the sheet is fed after the first punching $a\ a$ both forward and laterally for punching the second holes $b\ b$; it is then fed again forwardly and with a contrary lateral movement, and the third punchings $a'$ are formed, followed by another simultaneous forward and lateral feed for the punches $b'\ b'$, the direction of feed being indicated by the line $x'$. The two methods of feeding thus described are very simple and easily accomplished by feed mechanisms as existing prior to this invention.

Figure 20:
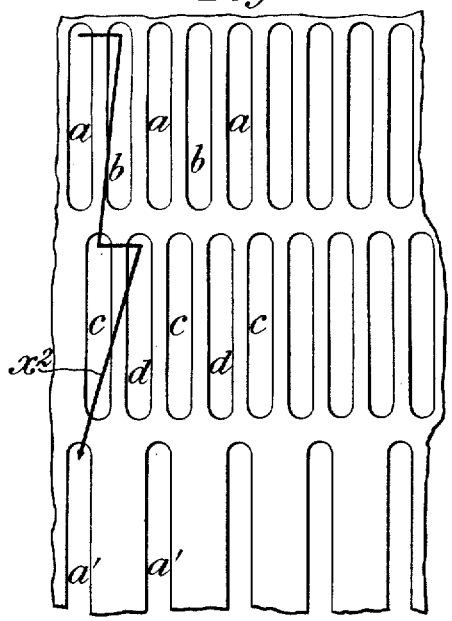

In Fig. 20 is shown an arrangement of punchings known as "hit and miss endways," which involves a more complicated series of feed movements. After the first punchings $a\ a$ the sheet is fed transversely and the second punchings $b\ b$ are made, whereupon a forward feed is given accompanied by a reverse transverse feed of half the extent of the previous one, whereupon the third punchings $c\ c$ are made; after which a full lateral feed is given, the holes $d\ d$ are then punched, and finally another forward feed is imparted accompanied by a reverse lateral feed equal to the sum of the previous lateral feeds, thereby restoring the sheet to its original lateral position ready for the punching of a new series of holes $a'$, after which the same series of movements is repeated. The line $x^2$ shows the successive feeding movements. This system of punching necessitates that the advance feed shall operate semi-periodically while the transverse feed operates periodically, its successive movements being (1) left, two units; (2) right, one unit; (3) left, two units; (4) right, three units (in this description for convenience the term "unit" is used to designate one-half the lateral spacing of the final punchings).

Figure 21:
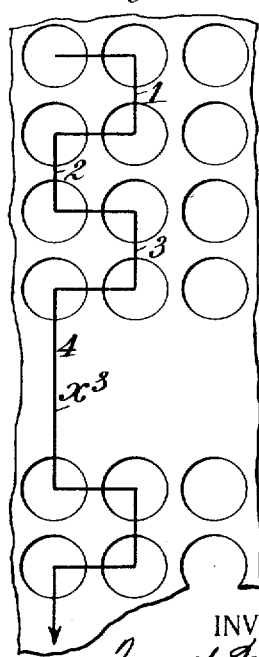

In Fig. 21 is given an example of a "jump" or skip feed, the punchings here shown being round, the feeding movements being alternately advance and lateral, as in Fig. 19, this feed continuing until as many rows of punchings have been made as are desired (three in the example shown), whereupon a long feed is given, its extent being sufficient to afford the desired width of blank or unpunched space, after which the normal feeding movements are resumed. The feeding movements are indicated by the line $x^3$.

The machine with its feed mechanisms to be described is capable of imparting other feeds than those shown, but these will serve as examples of its capabilities.

The punching press shown has a suitable frame 1, providing the usual bed for the dies, a sliding head or platen 2 carrying the punches, and a main shaft 3 having the usual cranks or eccentrics operating this head, all of which are so well known as to require no description.

For feeding the sheet it is gripped at its edges between pairs of knurled feed rolls 4, 4, there being preferably four pairs of these as shown in the plan, Fig. 3, so as to engage the sheet on opposite sides and at successive points in its forward travel. For imparting the advance feeding movements the four pairs of rollers are simultaneously rotated a suitable distance, whereby the sheet is bodily moved forward. For imparting the transverse feeding movements the four pairs of rollers are moved bodily in lateral or axial direction so that they carry the sheet with them transversely. These respective feeding mechanisms will now be described.

The advance feed mechanism comprises feed shafts 5 and 6, the former driving the forward pairs of rolls and the latter the rear pairs (see Fig. 3). The shaft 5 is driven intermittently as will be described; and carries a gear 29 which through an idler gear 30 (Fig. 2) drives a gear 31 fixed on the shaft 6 so that the shafts 5 and 6 turn simultaneously and equally. For driving the shaft 5 the main shaft 3 carries a gear 66ⁿ which drives a gear 12, and this in turn drives a pinion 11 (Fig. 2) which may turn freely on a shaft 7 having a crank 8 (Fig. 5). A spring latch 13 is seated in a hub 9 keyed on this shaft and engages a notch in the pinion except when pressed out of engagement by an inclined arm 16 of a lever 18 (Fig. 2) carrying a roller 19 acted on by a cam 20 carried by the gear 12. The arm 16 is normally pressed up by a spring 21 but may be put out of action by drawing down a rod 20 by turning an eccentric 23 by means of a handle 25. The pinion 11 revolves at the same speed as the main shaft 3, while the gear 12 revolves at half that speed. Consequently (when the handle 25 is turned up as shown) the cam 20 throws out the arm 16 at each alternate revolution and thereby permits the latch 13 to lock with pinion 11 the shaft 7 and crank 8, so that the crank 8 is turned during every alternate revolution and by the withdrawal of the latch is left motionless during the intervening revolutions. For holding it against displacement during these periods of inaction a friction brake is provided. The crank 8 connects through a rod 26 with a crank stud 26' on a disk 24, which carries one or any desired number of pawls, one being shown at 27, which engages the tooth of a ratchet wheel 28 keyed on the shaft 5. The crank 8 is adjustable so as to vary its throw according to the extent of advance feed desired. Each turn of the crank turns the disk 24 and pawls 27 a proportionate amount and thus imparts a forward rotation to shafts 5 and 6. These shafts are connected to the feed rolls 4 in the manner shown in Fig. 4. The shaft 5 (or 6, in the case of the rear rolls) has splined to it a pinion 36, driving the respective rolls through a train of pinions 42, 40, 41, 39. These are all carried in a frame 33, which is capable of sliding laterally on the main frame 1 to adjust the rolls 4 for different widths of sheets to be fed. When thus adjusted the frame 33 is clamped by means of a clamping rod 51 upon bar 50 extending parallel with the shaft 5. The bar 50 forms part of the transverse feed as will be described. The upper roller 4 of each pair is vertically movable, its spindle being carried in sliding boxes connected to one arm of a lever 43, the opposite arm of which is pressed up by a spring 44 or may be forced down by turning a shaft 48 which has a flattened side engaging this lever. The mechanism thus described constitutes the advance feed, and is the same as that set forth in said Patent No. 813,049. This mechanism, forming no part of the present invention, may be greatly varied, or substituted by any equivalent advance feed mechanism, without departing from the present invention.

The transverse feed mechanism comprises the transverse feed bar 50 already described, and a companion feed bar 50, both bars extending parallel for the entire width of the main frame of the machine, and projecting at one end (the left) where they are rigidly connected by a crosshead 58 (see Fig. 3). The four frames 33 carrying the four pairs of feed rolls, being clamped on these bars 50 as described, it follows that a movement of the crosshead 58 to right or left, imparts an equal right or left movement to the four pairs of feed rolls and hence to the sheet $y$, Fig. 3, which they hold. The means for imparting a variety of successive movements to the transverse feed frame thus composed, which constitutes the principal feature of the present invention, will now be described.

The crosshead 58 has pivoted to it upon a fulcrum pin 101 a lever A of the first class, its respective arms projecting upwardly and downwardly, and being engaged by any suitable means for laterally reciprocating these arms, these means being referred to as reciprocators B B' respectively. These reciprocators may be variously constructed and controlled in order that either or both of them may act upon the lever in either transverse direction, and either simultaneously, alternately or intermittently, according to the movement to be imparted by one or either of them through the lever to the transverse feed frame. These reciprocators are preferably formed as cranks 102 and 103 respectively, upon crank shafts C and C' respectively, these shafts being arranged on horizontal axes extending from front to rear, and mounted on suitable bearings applied to the left-hand frame of the machine. The cranks are shown with crank studs engaging sliding blocks 104 and 105 respectively, but this is not essential. The cranks are adjustable in length or throw in any suitable way, as for example, by mounting the crank studs upon slides 106 and 107 respectively (Fig. 6) adjustable in a crank disk 108 or 109 by means of a screw or otherwise, such screw being shown at 110 in Fig. 7.

Each shaft C or C' is provided with means for driving it forward a half turn at a time. The means shown are in detail similar to those illustrated in said Patent No. 813,049 for imparting a similar series of movements directly to the transverse feed frame. That is to say, a reciprocating rack 67 is slid up and down by means of a crank carried by the main shaft 3, motion being transmitted through a connecting rod 68 and rocker 68'. Each shaft C and C' has around it a tubular shaft or sleeve 70 or 70' on which is formed a pinion 69 or 69', both meshing with the rack 67 so that as the rack rises and falls the pinions and tubular shafts are turned each time a half-revolution forward and backward. These pinions are connected through their tubular shafts or hubs to drums 71 and 71' respectively, each of which carries a pawl 72 or 72' which engages a two-toothed ratchet 73 or 73', these ratchets being keyed upon their respective shafts C and C'. On each up-stroke of the rack the pawl 72 or 72' may engage one of the teeth of ratchet 73 or 73', and turn the shaft C or C' a half-revolution forward. The effect of this is to throw the crank stud of the shaft so turned from its extreme right-hand to its extreme left-hand position, or vice versa, so that it serves as a reciprocator to vibrate the lever A and through it to move the transverse feed frame to right or left. As thus described, when the pawl 72 engages the ratchet 73 at each forward turn, the reciprocator is moved periodically, since a half-turn is communicated to the shaft C (or C') to each reciprocation of the rack. When, however, it is desired to communicate these movements semi-periodically, the pawl is caused to engage the ratchet only at each alternate forward movement; and for this purpose a convenient means is the idler ratchet 76 disclosed in said Patent No. 813,049 which, as best shown in Fig. 10, has two notches of unequal depth, the deeper one 77 coinciding with the notches of the ratchet 73, while the shallow notch 78 has a depth insufficient to permit the pawl (which is wide enough to engage both ratchets) to engage the notches of the ratchet 73. Consequently, when the pawl engages the notch 78 it acts only to turn the idler ratchet 76 a half-turn, so that the shaft C (or C') remains stationary, but at the next movement the pawl drops into the deeper notch 77 and hence engages also a notch of the ratchet 73 and turns the latter and with it the shaft. For controlling the movements to determine whether either shaft shall be moved periodically or semi-periodically, it is only necessary to remove the idler ratchet for the one effect or apply it for the other. For this purpose it is conveniently made removable or reversible, having a prolonged hub so that upon reversing it the ratchet proper is out of the plane of the pawl. To prevent backward movements of the idler ratchet its hub is engaged by a friction brake 79, or it has a stop-pawl 79' or both. To prevent the shaft C C' being carried too far by momentum, and to prevent any recoil, these shafts are each provided with a stop dog 84 and a recoil check dog 85. The dog 84 is lifted out of its notch during the return movement by means of a cam 92 which acts on an arm 90, which through a shaft 89 and link 93, connects with the dog to retract it against its spring so that the shaft may be again turned forward. The detailed means thus described for imparting successive periodical or semi-periodical half turns to the shaft C and C', are, as already stated, substantially like the means set forth in said prior patent, and hence form no part of the present invention, and these means may be substituted for the purpose of this invention by any other mechanical movements adapted to accomplish the same result.

The effect of the mechanisms thus described in controlling the transverse feed may now be understood. According to the diagram, Fig. 11, the lever A and crosshead 58 are shown in outlines superposed upon lines illustrating the various paths of movement. The circles C and C' represent these shafts respectively, while the dotted circles $y$ and $z$ represent the orbits of the crank studs 102 and 103 of these shafts. The lines $e\ f\ g\ h$ indicate the center line of the lever in its different positions. In this example, the upper crank is adjusted to exactly twice the radius of the lower crank. The essential movements of the upper crank are those between the points $i$ and $j$, and the essential movements of the lower crank are those between the points $k$ and $l$, it being obviously immaterial whether these movements are performed by traveling through the arcs of circles $y\ z$, or by direct reciprocation along horizontal lines $w\ w'$ intersecting the respective points. The lever A is shown in position for starting the series of movements illustrated in Fig. 20. In the first movement the lower shaft is stationary and the upper shaft executes a half-turn which carries its stud from point $j$ to $i$; this throws the lever from $e\ e$ to $f\ f$, carrying its pivot 101 from $m$ to $p$ and displacing the crosshead 58 and transverse feed frame an equal distance or two units. At the next stroke of the press both shafts C C' turn together, moving their studs to diametrically opposite positions and thereby displacing the lever from $f\ f$ to $g\ g$, and shifting its fulcrum from $p$ to $q$ so that the transverse feed frame is moved to the right one unit. At the next stroke of the press the upper shaft alone turns again, shifting it from $j$ to $i$, the lower shaft remaining stationary so that the lever swings around the point $l$ and is displaced to position $h\ h$, thereby shifting its fulcrum from $q$ to $r$ and moving the feed frame two units to the left. At the next stroke of the press both shafts execute a half-turn, moving the upper crank stud from $i$ to $j$ and the lower one from $l$ to $k$ so that the lever is thrown bodily across from the position $h\ h$ to its original position on line $e\ e$, thereby shifting its fulcrum from $r$ to $m$ and carrying the transverse feed frame an equal distance, or three units. To accomplish these movements of the respective shafts the rack and pinion driving the upper shaft is made operative periodically by the removal of the idler or masking ratchet, 76, while the lower shaft is moved semi-periodically by the application to it of its idler or masking ratchet. The upper crank, having twice the throw of the lower one, imparts twice the angular movement to the lever, and since the line of travel of the lever fulcrum is equidistant between the axes of the shafts, it results that the upper crank imparts twice the displacement to the lever fulcrum and hence to the transverse feed frame that is imparted by the lower crank. Hence at each stroke the upper crank displaces the feed frame two units; when only a single unit is desired, the lower crank is turned at such time as to counteract the effect of the upper crank, thereby in effect subtracting one unit from the two imparted by the upper crank; and when three units are desired, the lower crank is turned in such direction as to coöperate with and supplement the effect of the upper crank, with the result of adding one unit to that imparted by the upper crank. Thus, during the periods of rest of the lower crank, the upper one imparts a two-unit movement to the feed; and during the coincident movements of the two cranks the movement imparted is either 2 minus 1, or 2 plus 1, as the case may be.

The described mechanism lends itself readily to other combinations such as will produce various successions of feeding movements, such as will adapt the machine to almost any conceivable arrangement of punchings that may be desired. For example, for the simple back and forth reciprocation of the transverse feed which is required for punching the combinations shown in either Figs. 18, 19 or 21, the arrangement shown by the diagram, Fig. 12, may be adopted. For this the lower crank is rendered inactive by adjusting its stud into coincidence with the center or axis. This is the position shown in Figs. 8 and 9. The upper crank is adjusted to a throw exactly twice that desired for the transverse feed. The upper shaft is arranged to be turned periodically or semi-periodically, as may be required for the proper correlation with the advance feed. It results that the lever swings around the lower shaft axis, as indicated by the lines $s$ $t$, thereby carrying its fulcrum pin 101 back and forth between the points $s'$ and $t'$. A similar result may be attained by the concurrent movement of both shafts, as indicated in the diagram, Fig. 13. Here the two cranks are adjusted each to travel in an orbit, the diameter of which exactly coincides with the extent of transverse feed required, and both shafts are turned simultaneously so that both act alike upon the lever whereby it is displaced at each movement between the positions $u$ and $v$, thereby displacing its pivotal point 101 from $u'$ to $v'$. Obviously, the same result would be secured by a differential adjustment of the crank throw of the respective cranks.

As before stated, the reciprocators acting upon the lever need not be cranks, but may move in horizontal lines or in any other suitable path, provided only that they execute movements from right to left at proper times with relation to the punches and to each other and to the advance feeding movements according to the mode of feeding that is desired, and provided that their reciprocating movements be of the proper amplitude for the purpose. To this end crank movements are the simplest and lend themselves most readily to the requisite adjustment and to the change from periodical to semi-periodical or other prescribed or desired arrangement of successive movements. As an illustration of rectilinearly-moving reciprocators acting upon the lever, I show in Fig. 14 a diagram wherein the reciprocators B B' are slides having pins engaging the lever A, the slides moving in suitable guides 110. For reciprocating them they are shown as actuated by cranks which may be on the same shafts C C' already described, these cranks engaging upright slots in the respective slides. These cranks should be adjustable to varying throw, as already described. When only an advance feed is desired, the transverse feed may be rendered nugatory by setting the cranks to give equal, simultaneous but opposite movements of both reciprocators, so as to simply rock the lever upon its fulcrum point, without imparting any movement to the feed.

Figs. 15 and 16 illustrate in plan and elevation a practical working-out of the arrangement just described with respect to the rack-and-pinion movements first described, the rack 67 driving a pinion 69 on a shaft 70, which through a ratchet and pawl or other intermittent mechanism, inclosed in casings 71 and 71', and with locking means engaging disks 108 and 109, serves to drive respectively the two shafts C and C' which are alined with the pinion shaft to front and rear thereof, and which shafts carry as before the respective cranks. The crank studs are shown as turning in blocks which slide in scotch-yokes carried on the respective sliding reciprocators B B'. On the latter are formed studs engaging blocks which slide in longitudinal slots in the lever A, which lever is fulcrumed at 101 to the crosshead 58, as already described, except that it extends longitudinally.

The means for producing the jump or skip feed, the product of which is shown in Fig. 21, will now be described.

For the normal series of punchings the advance and transverse feeds may operate according to any of the arrangements hereinbefore described. With the particular punchings shown in Fig. 21 the advance feed operates semi-periodically and the transverse feed also operates semi-periodically in alternation with the advance feed. For the jump feed required to form the blank or unpunched portion of the sheet, an auxiliary means is provided for abnormally operating the advance feed. This auxiliary feed control comprises essentially a crank or equivalent mechanical movement suitably connected to the driving pawls 27 of the advance feed, and timing means for operating this crank at the infrequent intervals necessary to produce the desired effect. This timing means may most conveniently be a cam carried on a gear wheel which is geared down from the main shaft of the machine in any desired ratio. The jump-feed crank may be coupled to the driving mechanism during one revolution at a time whenever its controlling cam determines such coupling. A suitable embodiment of these means is that best shown in Figs. 2 and 17. The jump-feed crank D is constructed like the main advance-feed crank 8, with means for adjusting the throw of its crank stud, and with means for coupling it to its driving pinion, which means may conveniently be the same as those already described with reference to Fig. 5. Its driving pinion is a counterpart of the pinion 11 and is lettered 11ª, being in mesh with the pinion 66ª. Its clutching latch, like the latch 13, Fig. 5, is operated by a lever arm 16ª constructed similarly to the lever arm 16 of Fig. 5. This lever arm is operated by a cam E carried on a slow-speed wheel F acting upon the roller 19ª of a lever 18ª, the lower arm of which is connected by a rod 20ª to the latch-controlling arm 16ª. The latter is normally pressed into position by a spring 21ª which may engage the rod as shown. The latch arm thus normally holds the latch withdrawn and out of action, so that the pinion 11ª turns idly and the crank D remains stationary. This continues until the cam E acts upon the roller 19ª to withdraw the arm 16ª, which releases the latch and causes it to clutch the pinion to the crank and turn the latter through one revolution, the cam E, like the cam 20, being so short that the latch arm 16ª is restored before this revolution is completed, so that it withdraws the latch and prevents a second revolution of the crank. In the construction shown the wheel F is driven by a pinion F' fastened to the gear 12, their proportions being such that the wheel F turns at one-fourth the speed of the main shaft 3. It results from this that the jump crank D is turned once to every fourth punching operation, so that this crank acts at every fourth feed to impart the prolonged or jump feed as shown in Fig. 21, where the successive feeding movements are indicated by the Figs. 1, 2, 3 and 4. Of course if the jump feed is desired to occur with any other frequency than every fourth feed, the ratio of gearing through which the cam E is driven must be correspondingly changed.

To enable the normal crank 8 and the jump-feed crank D to each operate the advance feed mechanism without interfering with the other, any suitable slip motion or take-up action may be interposed between the respective cranks and the advance feed mechanism. A convenient construction is that of telescopic rods, as best shown in Fig. 17. The operating stud 26' on the pawl-carrying wheel 24 is engaged not only by the rod 26 connecting with the crank 8, but also by a rod 26ª connecting with the crank D. Each of these rods is made telescopic so as to positively transmit a pull, while being capable of shortening to admit of an advance movement of the stud 26' imparted by the other rod, while its own crank is stationary. For this purpose the rod 26 or 26ª has a head 111 which may slide in a tubular rod 112, a spring 113 being introduced of sufficient stiffness to be effective to thrust the stud 26' back during the return or idle stroke of the crank. Thus in Fig. 17 where the crank 8 is acting, its rod 26 is pulling directly through the tubular portion 112 upon the stud 26', and the latter has pushed up the tubular portion 112 of the other rod 26ª to the extent indicated. Similarly, if the crank D were acting to give the jump feed (which with the mechanism shown may occur simultaneously with a revolution of the crank H), the rod 26ª would be pulling through its tubular portion 112 directly upon the stud 26', and to the extent that this movement exceeds that which would be imparted by the crank 8, the rod 26 of the latter would be telescoped within its tubular portion 112.

By suitably changing the gearing ratios by which the clutches controlling the cranks 8 and D are operated, and by suitably adjusting the throw of these cranks, almost any desired order and relative spacing of punchings may be attained. The variable advance feed thus provided may be variously correlated to the transverse feed so as to attain a great variety of results.

It must not be inferred from the particularity with which I have described herein the specific mechanism shown that my invention is by any means confined thereto, since it is susceptible of a great variety of modifications within the generic features which I have described and which are defined in the claims following. My invention is applicable to various specific feed mechanisms and various means for connecting and disconnecting the moving parts for accomplishing the requisite intermittent movements.

I claim as my invention:

1. In a machine of the described class, the combination of feeding means, a lever having a movable pivot connected to said feeding means, and reciprocators engaging said lever on opposite sides of its pivot.

2. In a machine of the described class, the combination of feeding means, a lever having a movable pivot connected to said feeding means, reciprocators engaging said lever on opposite sides of its pivot, and mechanism for operating said reciprocators intermittently.

3. In a machine of the described class, the combination of feeding means, a lever having a movable pivot connected to said feeding means, reciprocators engaging said lever on opposite sides of its pivot, and mechanism for operating said reciprocators at determined intervals.

4. In a machine of the described class, the combination of feeding means, a lever having a movable pivot connected to said feeding means, reciprocators engaging said lever on opposite sides of its pivot, and means for varying the stroke of one of said reciprocators at will, whereby to vary the movement transmitted from the pivot to the feeding means.

5. In a machine of the described class, the combination of feeding means, a lever having a movable pivot connected to said feeding means, and reciprocators engaging said lever on opposite sides of its pivot, means for varying the stroke of either of said reciprocators at will, and mechanism for operating said reciprocators at determined intervals.

6. In a machine of the described class, the combination of feeding means, a lever pivotally connected thereto, reciprocators engaging said lever on opposite sides of its pivot, and mechanism for operating said reciprocators periodically or semi-periodically at will.

7. In a machine of the described class, the combination of feeding means, a lever pivotally connected thereto, and reciprocators engaging said lever on opposite sides of its pivot, and mechanism for operating one of said reciprocators periodically and the other semi-periodically.

8. In a machine of the described class, the combination of feeding means, a lever pivotally connected thereto, and reciprocators engaging said lever on opposite sides of its pivot, and mechanism for operating either of said reciprocators periodically and the other semi-periodically at will.

9. In a machine of the described class, the combination of feeding means, a lever pivotally connected thereto, reciprocators engaging said lever on opposite sides of its pivot, and means for throwing one of said reciprocators out of operation at will.

10. The combination with feeding means of a lever pivotally connected thereto, and means for reciprocating said lever comprising cranks engaging its opposite arms respectively, and mechanism for imparting half-turns to said cranks at determined intervals.

11. The combination with feeding means of a lever pivotally connected thereto, and reciprocators for said lever comprising cranks engaging its opposite arms respectively, one of said cranks being adjustable to vary its throw, and means for imparting half-turns to said cranks at determined intervals.

12. The combination with feeding means of a lever pivotally connected thereto and reciprocators for said lever engaging its opposite arms respectively, one reciprocator adapted to impart to the lever a movement in excess of that imparted by the other, and mechanism for operating said reciprocators at determined intervals.

13. The combination with feeding means of a lever pivotally connected thereto, and reciprocators for said lever engaging its opposite arms respectively, one reciprocator adapted to impart to the lever a movement double that imparted by the other, and mechanism for operating said reciprocators at determined intervals.

14. The combination with feeding means of a lever pivotally connected thereto, and reciprocators for said lever engaging its opposite arms respectively, one reciprocator having a stroke double that of the other, and mechanism for operating said reciprocator of longer stroke at regular intervals, and for operating said reciprocator of shorter stroke at each alternate stroke of the other.

15. The combination with feeding means of a lever pivotally connected thereto, reciprocators for said lever engaging its opposite arms respectively, one reciprocator adapted to impart twice the movement to the lever that the other imparts, and mechanism for operating the former reciprocator periodically and the latter semi-periodically.

16. The combination with feeding means of a lever pivotally connected thereto, means for reciprocating said lever comprising cranks engaging its opposite arms respectively, mechanism for intermittently imparting half-turns to said cranks, and means controllable at will for causing said mechanism to act periodically or semi-periodically upon either crank.

17. The combination with feeding means, comprising a slide, of a lever having a movable pivot connected to said slide, reciprocators engaging said lever on opposite sides of its pivot, and means for operating said reciprocators at determined intervals.

18. The combination with feeding means, of a lever pivotally connected thereto, reciprocators engaging said lever on opposite sides of its pivot, and mechanism for operating said reciprocators intermittently, said mechanism for each reciprocator comprising a reciprocating part, a rotary part oscillated therefrom, an intermittently rotating part, an interposed ratchet and pawl whereby the latter is driven from the former, and means controllable at will for varying the action of said ratchet and pawl.

19. In a machine of the described class, the combination of advance and transverse feeding means, controllable mechanism for operating the advance feeding means, and mechanism for operating the transverse feeding means comprising a lever pivotally connected thereto, reciprocators engaging said lever on opposite sides of its pivot, and mechanism for operating said reciprocators at determined intervals.

20. In a machine of the described class, the combination of advance feeding means comprising feed-rolls, a normal feeding mechanism for operating the same at determined intervals to turn said rolls through a given angle, and an abnormal feeding mechanism adapted to operate the same at longer determined intervals to turn said rolls through a greater angle.

21. In a machine of the described class, advance and transverse feeding means, the former comprising feed-rolls and the latter adapted to displace said rolls axially, and mechanisms for operating them respectively at determined intervals to impart a prescribed succession of feeding movements, and abnormal feeding mechanism adapted to operate said advance feed at determined intervals to turn said feed-rolls to an abnormal extent and thereby impart a jump movement.

22. In a machine of the described class, an advance feeding means, a normal feeding mechanism therefor comprising a crank and a clutch, and operating means controllable at will for engaging said clutch to turn said crank continuously or intermittently, combined with an abnormal feeding mechanism comprising a crank, a clutch and a time mechanism controlling said clutch for operating it at determined intervals to produce a succession of jump feeds.

In witness whereof, I have hereunto signed my name in the presence of two subscribing witnesses.

FRANK M. LEAVITT.

Witnesses:
H. C. SEAMAN,
JOHN D. McINTYRE.

Copies of this patent may be obtained for five cents each, by addressing the "Commissioner of Patents, Washington, D. C."